United States Patent [19]

Otabe et al.

[11] Patent Number: 4,492,042
[45] Date of Patent: Jan. 8, 1985

[54] METHOD FOR DRYING COKING COALS TO BE CHARGED IN A COKE OVEN

[75] Inventors: Norio Otabe; Yoshiaki Shimakawa; Hiroshi Uematsu, all of Fukuoka, Japan

[73] Assignee: Nippon Steel Corporation, Tokyo, Japan

[21] Appl. No.: 412,523

[22] Filed: Aug. 26, 1982

[30] Foreign Application Priority Data

Aug. 28, 1981 [JP] Japan .................................. 56-134220
Aug. 28, 1981 [JP] Japan .................................. 56-134221

[51] Int. Cl.³ .............................................. F26B 3/28
[52] U.S. Cl. .......................................... 34/35; 34/86; 34/134; 201/39
[58] Field of Search .................... 34/35, 86, 134, 138; 201/39, 9; 202/227, 228

[56] References Cited

U.S. PATENT DOCUMENTS

| 4,284,476 | 8/1981  | Wagener et al.   | 34/86  |
| 4,308,102 | 12/1981 | Wagener et al.   | 201/39 |
| 4,338,160 | 7/1982  | Delessard et al. | 201/39 |
| 4,392,823 | 7/1983  | Weber et al.     | 34/134 |

Primary Examiner—Larry I. Schwartz
Attorney, Agent, or Firm—Wenderoth, Lind & Ponack

[57] ABSTRACT

Disclosed are methods for drying coking coals to be charged in coke ovens utilizing a heating medium which recovers the sensible heat contained in the gas generated in the coke ovens as a heating source for drying coking coals to a desired moisture content. Chiefly based on the moisture of coking coals before drying, the flow rate of the heat medium to the coke dryer is controlled or a hot blast generated in a separate heating system is used for the drying.

9 Claims, 6 Drawing Figures

METHOD FOR DRYING COKING COALS TO BE CHARGED IN A COKE OVEN

BACKGROUND OF THE INVENTION

1. Field of the Invention:

The present invention relates to a method for drying coals, particularly coking coals, by using a heating medium for exchanging the sensible heat of a gas generated from coke ovens and using this heat medium containing the sensitive heat as a main heat source for the drying.

2. Description of Prior Arts:

In coke ovens in which coking coals are distilled to produce cokes, the oven gas generating during the distillation in carburization chambers passes through ascension pipes to bend pipes communicating with dry mains and the gas is cooled in the bend pipes by a liquor spray with ammonia liquor, then the oven gas collected in the bend pipes is further cooled down to about ordinary temperatures by gas coolers. The gas generated from the coke ovens is usually at a temperature ranging from 600° to 800° C., but due to the lack of efficient means for recovering the heat contained in the oven gas, or due to a failure in finding appropriate applications for the recovered heat from the oven gas, no practical trials have been made for recovering the waste heat of the coke oven gas.

Meanwhile, in coke ovens, combustion chambers provided adjacent the carbonization chambers and gaseous fuels are burnt therein for the purpose of distillation of coking coals, and only part of the waste gas generated by the combustion is recovered in heat regenerating chambers and the remainder is not utilized in the conventional arts.

The present inventors have made extensive studies and experiments for recovering the sensible heat contained in coke oven gases from the point of energy savings and proposed a method as disclosed in Japanese Patent Application Laid-Open No. Sho 55-40736, according to which a heat-stable organic heat medium, such as alkyldiphenyl, having a high boiling point, high fluidity at low temperatures, and being usable as liquid under ordinary pressure is supplied through heat conductive pipes arranged in the inside wall of ascension pipes of coke ovens to recover the sensitive heat of coke oven gases and utilize this recovered heat for pre-heating the combustion gas for hot blast ovens.

The method just mentioned above has been found to be very effective to recover the heat at a high recovery ratio.

SUMMARY OF THE INVENTION

One of the objects of the present invention is to provide methods for drying coking coals utilizing the recovered heat of coke oven gas as a main heat source for drying coking coals.

According to the present invention, the sensible heat of the coke oven gas which hitherto been dispersed, wastefully into cooling water is recovered by a heating medium in ascension pipes, for example, of coke ovens, and the heat thus recovered is used as a heat source for drying coking coals to be charged in coke ovens so that significant advantages can be obtained with respect to the operation and equipment of coke ovens as well as the energy saving.

The method of the present invention comprises recovering the sensible heat contained in a gas generated from a coke oven by a heat exchanger, using a heating medium.

In the case where the moisture content of the coking coal before drying is higher than a predetermined value, there is performed a step of heating the heating medium which has recovered the sensible heat of the coke oven gas, to a temperature high enough to dry the coking coal to the predetermined moisture content.

In the case where the moisture content of the coking coal before drying is lower than a predetermined value, there is performed the step of by-passing a part or all of the heating medium to a cooler or directly back to the heat exchanger, rather than using all of the heating medium for drying the coking coal. The amount of by-passed heating medium is determined on the basis of the moisture content of the coking coal before drying, the predetermined moisture content of the coking coal after drying and the temperature of the heating medium which has recovered the sensible heat of the coke oven gas.

The coking coal to be charged into the coking oven is dried with the heating medium containing the sensible heat of the coke oven gas as described above and the heating medium is maintained at a predetermined temperature at the inlet of the heat exchanger.

According to a modification of the present invention, the coking coal to be charged into the coke oven is dried indirectly by the heating medium containing the sensible heat of the coke oven, with recirculation of the heating medium, and when the coking coal to be charged to the coke oven contains moisture higher than a predetermined value, a hot blast generated in a separate system, is introduced into the drier to directly dry the coal.

DETAILED EXPLANATION OF THE INVENTION

According to the present invention, the sensitive heat of the coke oven gas at about 600° to 800° C. is recovered through a heating exchanger provided in the ascension pipe portion of the coke oven using an organic heat medium flowing through a flow path provided between the inner and outer mantles and the heat medium which has captured the sensible heat of the oven gas is supplied to the coal drier as a heat source for drying.

Generally, the moisture content in the coking coal will vaporize during the distillation of the coal in the coke oven, and the heat energy required for the vaporization of moisture is about 2.5 times the theoretical value, thus requiring a large amount of fuel. Therefore, it is most desired that the moisture content in the coking coal be decreased to almost 0% from the point of energy saving. However, from the aspect of handling of the coal, there are limitations in drying the coal in the conventional arts, because as the moisture content decreases the possibility of dust generation during the transportion and the possibility of explosion during the charging to the coke oven will remarkably increase.

Figure 1:
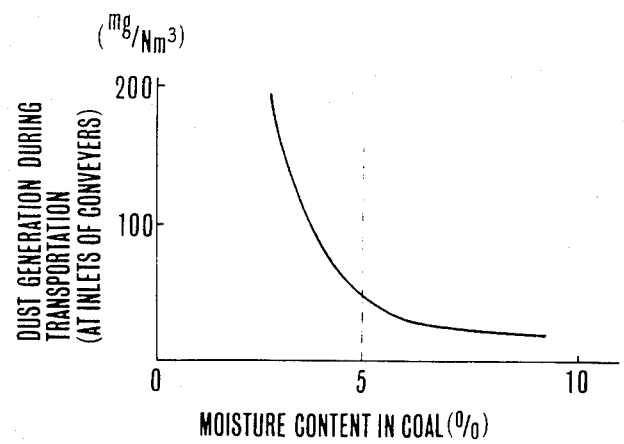
FIG. 1 shows the relation between the dust generation during transportation and the moisture contents in coking coals.

According to the studies of the present inventors, as illustrated in FIG. 1, the dust generation during the transportation of coals will remain low if the moisture is not lower than about 5%, but will sharply increase if the moisture is lower than 5%. It has also been found that if the moisture content is about 5%, there is no possibility of explosion during the charging to the coke oven. Thus it has been found that the energy saving effect can be satisfactorily achieved by maintaining the moisture content in the coking coal at about 5% without providing a separate dust collecting system and an additional improvement in the charging car.

Figure 2:
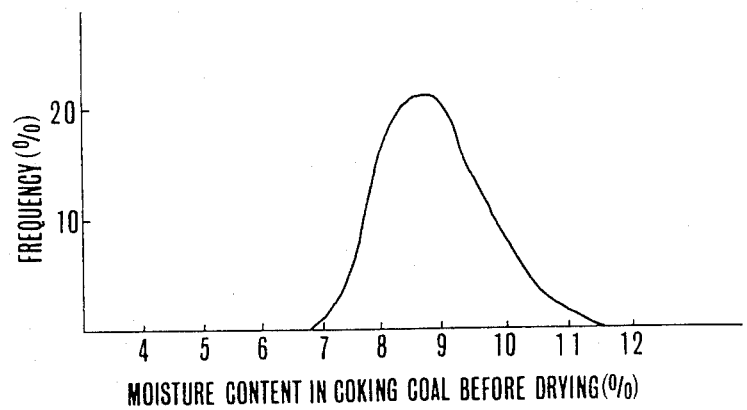
FIG. 2 shows the frequency distribution of moisture contents in coking coals before drying.

Meanwhile, as shown in FIG. 2, the moisture contents in coking coals vary between 7 and 11% depending on the storing condition in storing yards as the climate changes. It has been found that the amount of heat which can be recovered from the coke oven gas is almost equal to the heat energy which can decrease the moisture content of the coal by 4%. Thus, when the moisture content is 7%, the recovery of the sensible heat of the coke oven will be excessive. Therefore only part of the heating medium in an amount required for decreasing the moisture content 7% to 5% is supplied to the coal drier, while the remainder of the heating medium is passed through by-pass routes to join the main heating medium flow coming out of the drier. In this case, as the heat discharge in the drier is relatively small, the temperature of the heat medium rises during the circulation. However, it is desirable that the temperature of the heat medium entering the heat exchanger be maintained constant and for this purpose a cooler for cooling the heating medium is provided between the drier and the heat exchangers in the ascension pipe portions. In this way, the desired moisture content of about 5% of the coking coal to be charged in the coke oven can be obtained.

In the cases where the moisture contents of the coking coals before the charging to the coke oven are about 11%, the moisture content will be decreased to about 7% by the heat recovered by the heating medium, and it is desirable further to decrease the moisture content to about 5% by providing an additional means for heating the heating medium.

Figure 3:
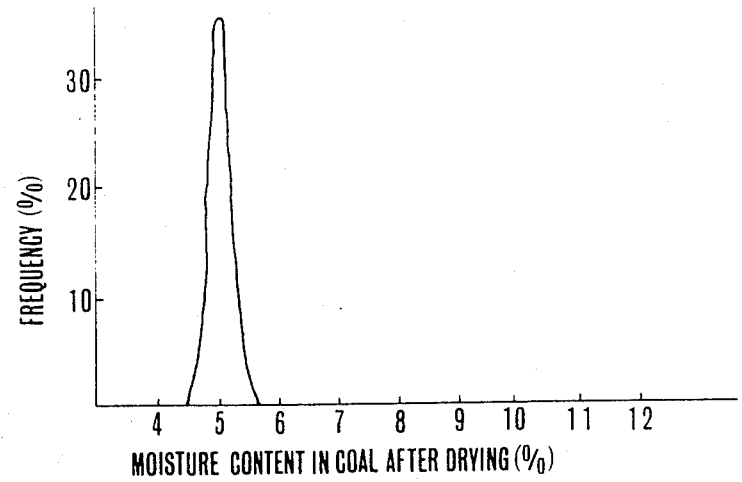
FIG. 3 shows the frequency distribution of moisture contents in coking coals after drying.

Thus, according to the present invention, the amount of the heating medium, as well as the amount of the fuel used in the coke oven, is adjusted in accordance with the variation of the moisture content of the coking coal to be charged in the coke oven, and desirably the temperature of the heating medium is controlled at the entrance of the heat exchanger. In this way, as shown in FIG. 3, the moisture content in the coking coal is maintained constantly at about 5%.

Regarding the temperature of the heat medium entering the ascension pipe:

(1) a lower temperature is desirable for maintaining a larger difference between the gas temperature of the coke oven and the temperature of the heating medium so as to recover a larger amount of heat energy;

(2) a higher temperature of the heating medium is desirable for assuring a larger amount of the heat exchange in the indirect-type coal drier by providing a larger difference between the temperature of the heat medium and the temperature of the coking coal;

(3) it is desirable to maintain the heating medium at a temperature lower than the boiling temperature of the heat medium so as to use it in a liquid state, thus saving the cost of the transportation of the heating medium and the cost of the piping arrangement; and (4) it is desirable to maintain the heating medium at a constant temperature so as to facilitate and simplify the control of the circulation system of the heat medium.

In a preferable embodiment of the present invention, the cooler provided before the ascension pipe is operated when the temperature of the heat medium coming out from the coal drier is higher than the predetermined temperature. On the other hand, when the temperature of the heating medium is lower than the predetermined temperature, the amount of the fuel used in the heating furnace for heating the heating medium is increased so as to control the temperature of the heating medium entering the ascension pipe. Thus the temperature of the heating medium entering the ascension pipe can be controlled to a constant temperature by connecting the heating medium heating furnace, the coal drier and the cooler in the circulation system.

As described hereinabove, the feature of the present invention lies in that the sensible heat of the coke oven gas is recovered with a heating medium and this heating medium is used as the heat source for drying the coking coal.

However, there is no specific limitation regarding the structure of the heat exchanger provided in the ascension pipe. For example, the inner side of the mantle wall of the coke oven is not coated with lining and the oven gas is cooled by the heating medium directly through the mantle wall, or the mantle wall may be coated with an appropriate lining. In any event, the heating medium path is formed between the inner and outer mantles of metal, or the path is made by a straight or spiral piping arrangement so as to circulate the heating medium therethrough to recover the sensitive heat of the coke oven gas and increase the temperature of the heating medium.

Hereinbelow, the description will be made of the modification of the present invention where a hot blast generated in a separate heating system is used for drying the coal containing moisture more than the predetermined level.

Figure 5:
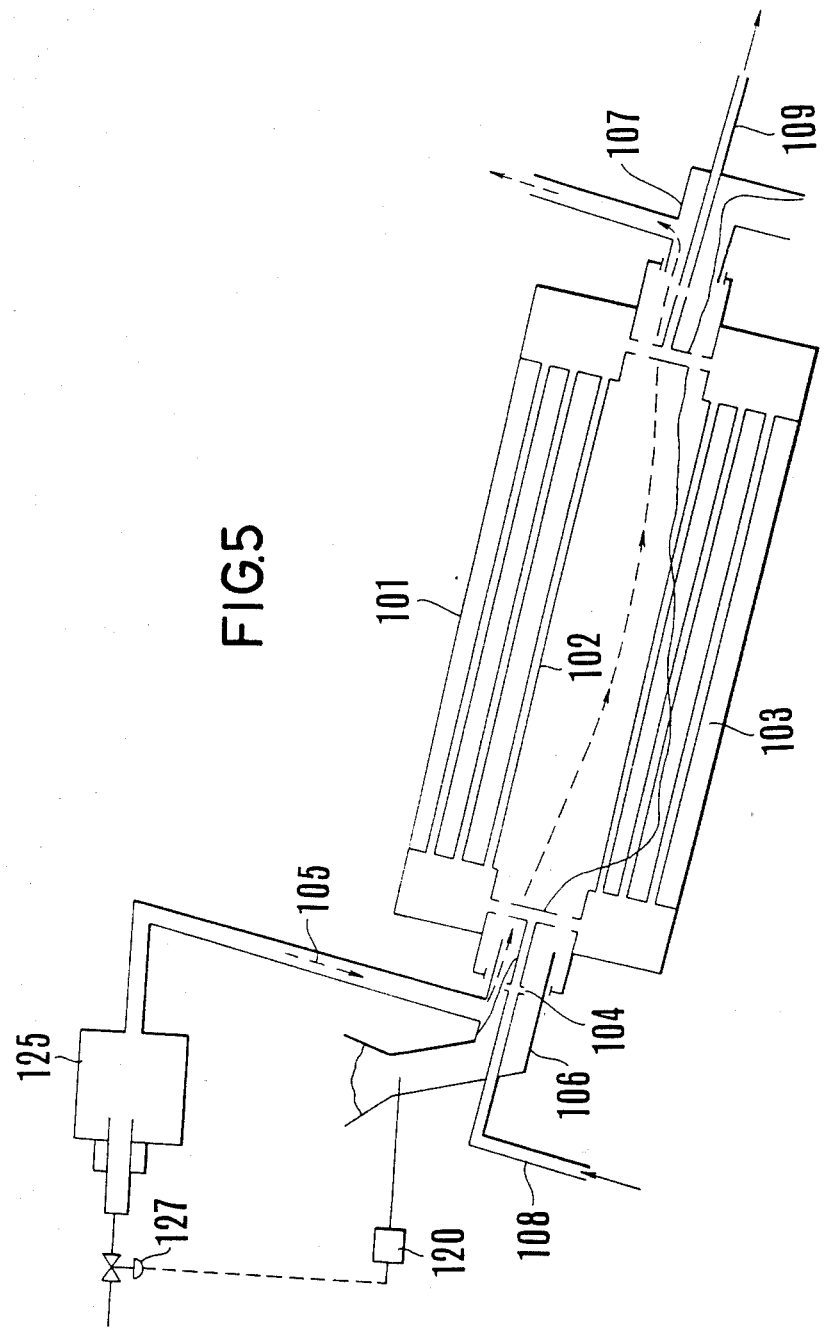
FIG. 5 shows schematically a modification of the present invention.

As shown in FIG. 5, the hot blast generated in the separate system is blown into the drier to bring the coal into direct contact with the hot blast to evaporate the moisture content of the coal. According to this modification, in a multi-pipe indirect type of rotary drier incorporating a number of pipes 102 in the cylindrical body 101, the heating medium at high temperatures is passed through the pipes so as to perform an indirect heat exchange with the coal 103 moving the outside of the pipes, thus constantly evaporating a constant amount of the moisture contained in the coal and assuring a moisture content 7% of the coal. Meanwhile, in order to obtain the desired moisture content of 5%, the hot blast 105 generated in the hot blast oven 125 is blown into the drier through the front portion 106 or the rear portion 107 so as to bring the coal into direct contact therewith, thus performing the heat exchange, and the waste gas is discharged from the rear portion 107 or the front portion 106. In this case, the hot blast is maintained at a flow rate and at a temperature just sufficient to decrease the moisture content of the coal by 2%, but it is desirable that the flow rate as well as the temperature of the hot blast can be changed in order to desirably adjust the degree of drying of the coal.

For this purpose, moisture meter 120 is provided to measure the moisture contents and the signals thereof are sent to the fuel adjusting valve 127 of the hot blast generator to control the fuel supply. In this way, it is possible to adjust the amount of the fuel used in the hot blast generator in accordance with the variation of the moisture content in the coal and control the flow rate and temperature of the hot blast at the entrance of the drier, thus maintaining the moisture of the coal coming out from the drier constantly at about 5% as shown in FIG. 3. The numerical references 104, 108 and 109 represent respectively a joint, an entrance for the heating medium and an outlet for the heating medium.

DESCRIPTION OF THE PREFERRED EMBODIMENTS

The present invention will be better understood from the following embodiments. EXAMPLE 1

Figure 4:
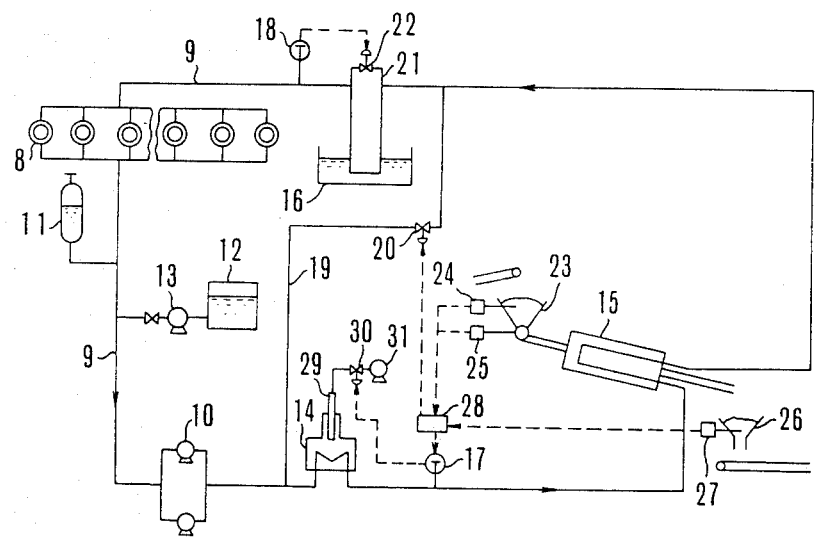
FIG. 4 shows a schematic arrangement of equipment for practising the present invention.

In this embodiment, the heat recovery is performed in the ascension pipe portion of the coke oven and at the same time, the heating medium heating furnace, the indirect type coal drier and the cooling means are efficiently and reasonably connected as illustrated in FIG. 4.

In FIG. 4, the system for recovering the sensitive heat of the coke oven in the ascension pipes comprises a heat exchange means connected to the heat medium circulation piping 9 at the inlet and the outlet, a heating medium circulation pump 10 in the outlet piping 9, an expansion tank 11, a heating medium storing tank 12 and a supplying pump 13 at appropriate intermediate portions of the piping 9.

Meanwhile, the system for utilizing the sensitive heat of the coke oven gas for drying the coking coal comprises a heating medium heating furnace 14 provided at the intermediate portion of the piping 9 of the heat recovering system, an indirect type coal drier 15 and a cooler 16 arranged after the furnace, a temperature detector 17 at the outlet of the heating furnace 14, a temperature detector 18 at the outlet of the cooler 16, a flow rate adjusting valve 20 at the intermediate portion of the by-pass pipe 19 of the indirect type coal drier 15, a flow rate adjusting valve 22 at the intermediate portion of the by-pass pipe 21 of the cooler 16, a moisture meter 24 at the coal supply hopper 23 to the coal drier 15, a coal discharge meter 25, a moisture meter 27 at a reception hopper 26 at the outlet of the drier, a calculator 28 for controlling the moisture content of the coal after the drying to 5%, a gas burner 29 in the heating medium heating furnace, a gas amount adjusting valve 30 and a gas supplying blower 31.

The heating medium normally flows in the direction shown by an arrow along the solid line in FIG. 4. The heating medium heated in the ascension pipe 8 is pressured forced by the circulation pump 10 to pass through the heating medium heating furnace 14 to enter the coal drier 15 where the heating medium discharges the heat to the coal. The amount of heat discharge here is almost equal to the heating, about 50,000 Kcal/ton of coal which the heat medium absorbs in the ascension pipe, and it is equivalent to the heat energy required for decreasing the moisture content of the coal by 4%. Therefore, when the moisture content at the entrance of the drier is 11%, the moisture content obtained at the outlet of the drier will be 7%. In order to achieve the desired final moisture content of 5%, the heating medium is heated from 200° C. to 220° C. in the heating furnace. This can be performed by detecting the coal discharge amount by the meter 25, detecting the moisture content by the moisture meter 24 and then by the moisture meter 27, processing the signals thus obtained by the calculator to set the temperature of the heating medium at the entrance of the drier, and controlling the combustion gas flow rate by the flow rate valve 31 on the basis of the temperature signal so as to maintain the set temperature of the heating medium in the heating furnace.

Meanwhile, when the moisture content at the entrance of the drier is 7%, the moisture content at the outlet is 3%. This means an excessively dried state, very likely to cause troubles such as dust generation. Therefore, in order to dry the coal to the desired moisture content of 5%, the amount of the heating medium passing through the by-pass pipe 19 and entering the drier is decreased for this purpose, the amount of coal discharge is detected by the discharge meter 25, the moisture content of the coal is detected by the moisture meter 24 and then by the meter 27, and the detection signals thus obtained are processed by the calculator to control the flow rate of the heating medium passing through the by-pass pipe 19 by the flow rate adjusting valve 20.

For prevention of the degradation of the heating medium and the idle operation of the circulation pump, the heating medium is used in a liquid state. For this purpose, if the boiling point of the heating medium is 280° C., it is desirable to use the medium at about 200° C. or lower so as to provide a margin of about 80° C.

In this case, the temperature of the heating medium is set at 160° C. at the entrance of the ascension pipe and set at 200° C. at the outlet of the pipe. If the moisture content of the coal at the entrance of the coal drier continues to be at or about 7%, the amount of the heating medium pasing through the by-pass pipe 19 increases and the temperature of the heating medium at the entrance of the ascension pipe increases to a temperature beyond the boiling point of the heating medium in the course of circulation. In order to prevent this excessive temperature increase, the cooler 16 is provided to maintain the heating medium at the entrance of the ascension pipe at a constant temperature. This can be done by detecting the temperature at the outlet of the cooler by the detector 18 to control the amount of the flow rate of the heating medium passing through the by-pass pipe 21 to maintain a constant temperature. There is no specific limitations on the cooling method.

The working data and results of the above embodiment are shown in Table 1.

TABLE 1

| | |
|---|---|
| Number of Ascension Pipes | 70 |
| Heat Energy Recovered in Ascension Pipes | 43000 Kcal/H |
| Temperature of Heating Medium | 160→200° C. |
| Circulation Rate of Heating Medium | 168 m³/H |
| Amount of Coal Treated | 60 T/H |
| Moisture Content in Coal | 9→5% |
| Moisture Content after Drying | 4% |
| Energy Saved | 60000 Kcal/ton of coal (3600000 Kcal/H) |
| Coke Yield Improvement | 1–2% |
| Consumption of Combustion Gas in Coke Oven (Moisture Content 9%) | 550 Nm³/ton of coal (33000 Nm³/H) |
| Consumption of Combustion Gas in Coke Oven (Moisture Content 5%) | 490 Nm³/ton of coal (29400 Nm³/H) |
| Difference (Mixed Gas decreased) | 60 Nm³/ton of coal |

TABLE 1-continued (3600 Nm³/H)

H = hour

EXAMPLE 2

This Example illustrates the modification of the present invention in which the sensible heat of the coke oven gas is recovered in the ascension pipe of the oven and at the same time a hot blast generator is efficiently and reasonably connected to the indirect type coal drier.

Figure 6:
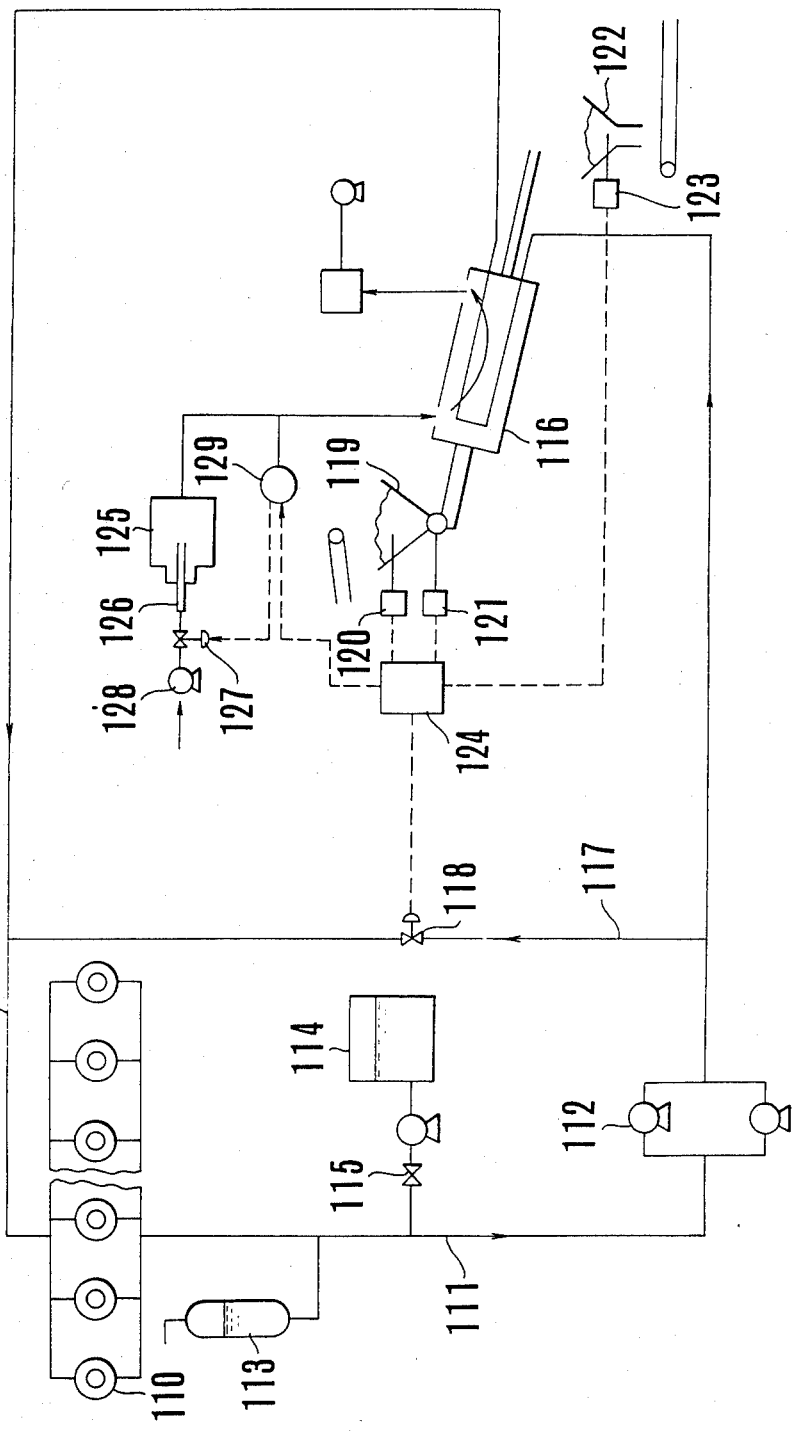
FIG. 6 shows a schematic arrangement of equipment for practising the modification of the present invention.

In FIG. 6, the sensible heat recovering system in this embodiment is same as that in the first embodiment. Thus the system comprises a heat exchanging means connected to the heating medium circulation piping 111 at the inlet and the outlet, a heating medium circulation pump 112 in the outlet piping 111, an expansion tank 113 a heating medium storing tank 114 and a supplying pump 115 at appropriate intermediate portions of the piping 111. Meanwhile, the system for utilizing the sensible heat of the coal oven gas in this embodiment comprises a multi-pipe type coal drier 116 provided in the path of the piping 111 of the heat recovering system, a flow rate adjusting valve 118 in the path of the by-pass pipe 117 of the coal drier, a coal supply hopper 119 to the coal drier, a moisture content meter 120, a coal discharge meter 121 provided in the hopper, a reception hopper 122 at the outlet of the drier, a moisture meter 123, a calculator 124 for controlling the moisture content of the coal after the drying to 5%, provided in the reception hopper, a hot blast generator 125, a gas burner 126, a gas amount adjusting valve 127 and a gas supplying blower 128, provided in the hot blast generator 125.

The heating medium normally flows in the direction shown by the arrow along the solid line as shown in FIG. 6. The heating medium heated in the ascension pipe 110 is forced by the circulation pump 112 to enter the coal drier where it discharges the heat to the coal. The heat energy discharged here is almost equal to the heat energy of about 50,000 Kcal/ton of coal which the heating medium catches in the ascension pipe. This energy is equivalent to decrease the moisture content in the coal by 4%. Thus when the moisture at the entrance of the drier is 11%, the moisture content at the outlet of the drier is 7%. In order to dry the coal to the aimed moisture content of 5%, the hot blast of 500° C. is generated in the hot blast generator and supplied to the drier at a flow rate of 100 Nm³/ton of coal.

For this purpose, the amount of coal discharge is detected by the discharge meter 121 and the moisture contents of the coal are detected by the moisture meters 120 and 123 and then their signals are processed by the calculator to set the temperature of the hot blast at the entrance of the drier. In the hot blast generator the temperature signal is received to control the flow rate of the combustion gas by the flow rate adjusting valve 127.

Meanwhile, when the moisture content at the entrance of the drier is 7%, the moisture content at the outlet is 3%, which indicates an excessively dried state, very likely to cause troubles such as dust generation etc. Therefore, in order to dry the coal to the desired moisture content of 5%, the amount of the heating medium passing through the by-pass pipe 117 is increased while the amount of the heating medium entering the drier is decreased. For this purpose, the amount of coal to be discharged is detected by the discharge meter 121, the moisture contents in the coal are detected by the moisture meters 120 and 123 and their signals are processed by the calculator to control the flow rate of the heating medium passing through the by-pass pipe 117 by the flow rate adjusting valve 118.

The working data and results of this embodiment are same as shown in Table 1.

As clearly understood from the foregoing descriptions, the present invention can efficiently recover the sensible heat from the coke oven gas and at the same time can advantageously utilize the recovered heat as a heat source for drying the coking coals to be charged in the coke ovens, thus remarkably reducing the amount of fuel consumed in the coke ovens and remarkably improving the coke production yield. In conclusion, the present invention is very advantageous from the aspect of energy saving.

What we claim:

1. A method for drying coking coals to be charged into a coke oven, which comprises:
   (a) recovering the sensible heat from a gas generated in a coke oven with a liquid heating medium, said medium being in a heat exchange relationship with said gas in a heat exchanger;
   (b) determining the amount of heat needed to reduce the moisture content of the coking coal to a prescribed value;
   (c) heating the heating medium recovered from step (a) to a temperature suitable to reduce the moisture content of the coking coal to said prescribed value;
   (d) reducing the moisture content of said coking coal to said prescribed value by the use of the heating medium obtained in step (c); and
   (e) controlling the temperature of the heating medium prior to introduction into the heat exchanger of step (a) so that the temperature of the heating medium remains lower than its boiling point after heat exchange.

2. The method of claim 1 wherein only a portion of the heating medium from step (a) is employed in step (d), said portion being determined on the basis of the amount of heat needed to dry the coking coal to a prescribed value as calculated in step (b) and the temperature of the heating medium recovered from step (a).

3. The method according to claim 2 wherein the portion of the heating medium from step (a) which is not employed in step (d) is subjected to cooling and is then recycled to said heat exchanger.

4. The method according to claim 1 wherein a minor portion of the heat required to remove moisture from said coking coal in step (d) is provided by a blast of hot gas directly contacting the coking coal and a major portion of said heat is provided by said heating medium from step (c) which indirectly contacts said coking coal in a heat exchange relationship.

5. The method according to claim 4 wherein the amount and/or temperature of the hot gas blast is controlled to obtain a coking coal having a moisture content of the prescribed value.

6. The method of claim 1 wherein when the coking coal has a moisture content before drying which is higher than the prescribed value, the heating in step (c) is performed to a sufficient extent to reduce the moisture content to the prescribed value and when the moisture content of the coal before drying is lower than the prescribed value, a portion or all of the heating medium from step (a) is passed to a cooler prior to recycling to the heat exchanger.

7. The method of claim 6 wherein all of the steps are performed in communication with a heating medium flow path.

8. The method according to claim 7 in which a part or all of the heating medium is forwarded to a cooler prior to being recycled to the heat exchanger.

9. The method according to claim 7 wherein all or a part of the heating medium is forwarded to step (c).

* * * * *